United States Patent

Brückner et al.

[11] Patent Number: 6,047,548
[45] Date of Patent: Apr. 11, 2000

[54] GAS AND STEAM TURBINE PLANT AND METHOD FOR OPERATING THE SAME

[75] Inventors: Hermann Brückner, Möhrendorf; Erich Schmid, Marloffstein, both of Germany

[73] Assignee: Siemens Aktiengesellschaft, Munich, Germany

[21] Appl. No.: 09/192,753

[22] Filed: Nov. 16, 1998

Related U.S. Application Data

[63] Continuation of application No. PCT/DE97/00887, Apr. 30, 1997.

[30] Foreign Application Priority Data

May 14, 1996 [DE] Germany .......................... 196 19 470

[51] Int. Cl.[7] .................................................. F01K 13/00
[52] U.S. Cl. .............................................. 60/677; 60/679
[58] Field of Search .............................. 60/653, 677, 679

[56] References Cited

U.S. PATENT DOCUMENTS

| | | | |
|---|---|---|---|
| 3,016,712 | 1/1962 | Taylor | 60/679 X |
| 4,598,551 | 7/1986 | Dimitroff, Jr. et al. | 60/679 X |
| 5,442,919 | 8/1995 | Wilhelm | 60/679 X |
| 5,570,579 | 11/1996 | Larjola | 60/679 X |

FOREIGN PATENT DOCUMENTS

| | | |
|---|---|---|
| 0523467A1 | 7/1991 | European Pat. Off. . |
| 0436536B1 | 5/1999 | European Pat. Off. . |
| 820600 | 11/1951 | Germany . |
| 4434526C1 | 4/1996 | Germany . |
| 957024 | 5/1964 | United Kingdom . |

*Primary Examiner*—Hoang Nguyen
*Attorney, Agent, or Firm*—Herner L. Lerner; Laurence A. Greenberg; Werner H. Stemer

[57] ABSTRACT

A gas and steam turbine plant includes a waste-heat steam generator disposed downstream of a gas turbine on the exhaust-gas side. The waste-heat steam generator has heating surfaces connected into a water-steam circuit of a steam turbine having a high-pressure part, a medium-pressure part and a low-pressure part. In order to achieve as high a plant efficiency as possible, a heat exchanger disposed outside the waste-heat steam generator is connected between the high-pressure part and the medium-pressure part on the primary side and between the medium-pressure part and the low-pressure part of the steam turbine on the secondary side. In a corresponding method for operating such a plant, low-pressure steam flowing to the steam turbine is heated by indirect heat exchange with medium-pressure steam flowing out of the steam turbine.

10 Claims, 1 Drawing Sheet

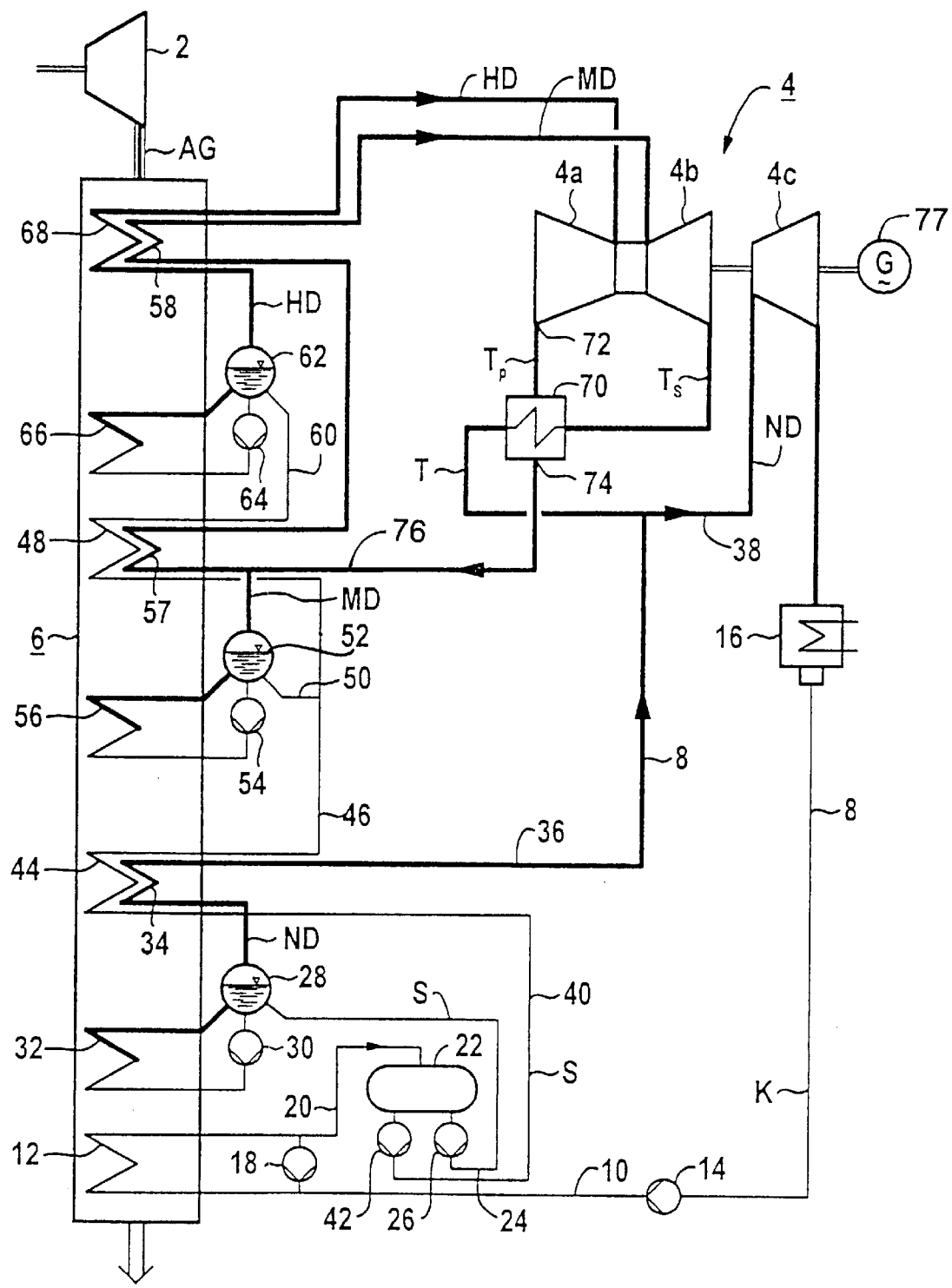

6,047,548

GAS AND STEAM TURBINE PLANT AND METHOD FOR OPERATING THE SAME

CROSS-REFERENCE TO RELATED APPLICATION

This application is a continuation of copending International Application No. PCT/DE97/00887, filed Apr. 30, 1997, which designated the United States.

BACKGROUND OF THE INVENTION

FIELD OF THE INVENTION

The invention relates to a gas and steam turbine plant with a waste-heat steam generator which is disposed downstream of a gas turbine on the exhaust-gas side and which has heating surfaces connected into a water-steam circuit of a steam turbine that has a high-pressure part, a medium-pressure part and a low-pressure part. The invention also relates to a plant operated according to the method.

In a gas and steam turbine plant, heat contained in expanded operating medium from the gas turbine is used to produce steam for the steam turbine. The transfer of heat is effected through the use of a number of heating surfaces, which are disposed in the form of tubes or tube bundles in a waste-heat steam generator located downstream of the gas turbine, on the exhaust side. Those surfaces, in turn, are connected into the water-steam circuit of the steam turbine. The water-steam circuit includes a plurality, e.g. two or three, pressure stages, each pressure stage having a preheater, an evaporator and a superheater as heating surfaces.

In order to achieve as high an efficiency of the plant as possible in the process of heat transfer, the configuration of the heating surfaces within the waste-heat steam generator is matched to the temperature profile of the exhaust gas of the gas turbine. In a three-pressure process with reheating, which is referred to as the three-pressure reheating process, a particularly high steam-turbine power and thus a particularly high overall efficiency of the plant is achieved for a given gas-turbine power. A gas and steam turbine plant operating in accordance with the three-pressure reheating process is known from European Patent 0 436 536 B1 and also from German Patent DE 44 34 526 C1, corresponding to allowed U.S. application Ser. No. 08/826,240, filed May 27, 1997. However, with those known plants as well, the overall efficiency in each case is limited to about 55%.

SUMMARY OF THE INVENTION

It is accordingly an object of the invention to provide a gas and steam turbine plant and a method for operating the same, which overcome the hereinafore-mentioned disadvantages of the heretofore-known devices and methods of this general type and in which an increase in efficiency of the plant is achieved by a further increase in utilization of heat content of exhaust gas from the gas turbine.

With the foregoing and other objects in view there is provided, in accordance with the invention, a gas and steam turbine plant, comprising a gas turbine having an exhaust-gas side; a steam turbine having a water-steam circuit, a high-pressure part, a medium-pressure part and a low-pressure part; a waste-heat steam generator disposed downstream of the gas turbine on the exhaust-gas side and having heating surfaces connected into the water-steam circuit of the steam turbine; and a heat exchanger disposed outside the waste-heat steam generator and having a primary side connected between the high-pressure part and the medium-pressure part of the steam turbine and a secondary side connected between the medium-pressure part and the low-pressure part of the steam turbine.

The invention starts from the consideration that heating or reheating of low-pressure steam flowing from the low-pressure part of the steam turbine can be carried out by indirect removal of heat instead of direct removal of heat from the flue gas by using exhaust steam from the steam turbine at a suitable temperature. Medium-pressure steam from the high-pressure part of the steam turbine has proven particularly suitable due to the particularly favorable temperature difference relative to the low-pressure steam.

The medium-pressure steam cooled in the heat exchanger in the case of indirect heat exchange is preferably heated to the nominal temperature in two stages. Therefore, in accordance with another feature of the invention, the heat exchanger is expediently connected, on the primary side, to the inlet of the medium-pressure part of the steam turbine by way of two superheater heating surfaces disposed downstream of the high-pressure part of the steam turbine and in series in the waste-heat steam generator in the direction of flow of the exhaust gas from the gas turbine.

Medium-pressure steam produced in the waste-heat steam generator in an evaporator heating surface is preferably mixed into the medium-pressure steam cooled in the heat exchanger, before both steam streams are superheated in the waste-heat steam generator. For this purpose, in accordance with a further feature of the invention, an evaporator heating surface disposed in the waste-heat steam generator is advantageously connected on the outlet side to the primary-side outlet of the heat exchanger.

In accordance with an added feature of the invention, each stage of the water-steam circuit expediently includes an evaporator heating surface and at least one superheater heating surface, and, in addition, a reheater heating surface connected between the high-pressure part and the medium-pressure part of the steam turbine is expediently provided.

With the objects of the invention in view, there is also provided a method for operating the gas and steam turbine plant, which comprises providing the water-steam circuit with three pressure stages; using heat contained in an expanded operating medium from the gas turbine to produce steam for the steam turbine; conducting feedwater in the water-steam circuit, and evaporating and superheating the feedwater in the heating surfaces of the waste-heat steam generator; and heating low-pressure steam flowing to the low-pressure part of the steam turbine by indirect heat exchange with medium-pressure steam flowing out of the high-pressure part of the steam turbine.

The advantages achieved with the invention are, in particular, that an especially high temperature of the low-pressure steam is achieved in a particularly simple manner and without additional control devices by the use of a heat exchanger, provided outside the waste-heat steam generator, for heating low-pressure steam by indirect heat exchange with medium-pressure steam. This leads to a particularly high overall efficiency of the plant. At the same time, plant management is made particularly simple and the reliability of the overall plant is increased. In order to permit particularly short pipe lines and small pressure losses, the heat exchanger is advantageously disposed in the region of the steam turbine, i.e. in the vicinity of the latter.

Other features which are considered as characteristic for the invention are set forth in the appended claims.

Although the invention is illustrated and described herein as embodied in a gas and steam turbine plant and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic circuit diagram of a gas and steam turbine plant with a separate heat exchanger for heating low-pressure steam.

DESCRIPTION OF THE PREFERRED EMBODIMENTS

Referring now in detail to the single FIGURE of the drawing, there is seen a gas and steam turbine plant which includes a gas turbine 2, a steam turbine 4 and a waste-heat steam generator 6 through which hot exhaust gas AG from the gas turbine 2 flows. The steam turbine 4 includes a high-pressure part 4a, a medium-pressure part 4b and a low-pressure part 4c. The waste-heat steam generator 6 is used to produce steam and has heating surfaces connected into a water-steam circuit 8 of the steam turbine 4.

For this purpose, the waste-heat steam generator 6 has a condensate preheater 12 with an inlet side connected through a condensate line 10 and a condensate pump 14 to a condenser 16 disposed downstream of the steam turbine 4. The condensate preheater 12 has an outlet side connected to its inlet side by a recirculating pump 18. The outlet side of the condensate preheater 12 is furthermore connected through a feedwater line 20 to a feedwater container 22.

The feedwater container 22 has an outlet side connected through a feedwater line 24 to a low-pressure drum 28. A pump 26 is inserted in the feedwater line 24. An evaporator heating surface 32 is connected through a recirculating pump 30 to the low-pressure drum 28. The low-pressure drum 28 has a steam side connected to a superheater heating surface 34 which is connected through a steam line 36 to a transfer line 38 leading from the medium-pressure part 4b to the low-pressure part 4c of the steam turbine 4. The low-pressure drum 28 and the evaporator heating surface 32, together with the superheater heating surface 34 and the low-pressure part 4c, form a low-pressure stage of the water-steam circuit 8.

The feedwater container 22 is furthermore connected on the outlet side through a feedwater line 40 to a first high-pressure preheater or economizer 44. A pump 42 is inserted into the feedwater line 40. A connecting line 46 connects the first high-pressure preheater or economizer 44 to an inlet of a second high-pressure preheater or economizer 48. The pump 42 and therefore the feedwater line 40 can also be connected to the feedwater line 24 on the delivery side of the pump 26, in a non-illustrated manner. A further economizer can also be provided as a medium-pressure preheater, which is then expediently disposed within the waste-heat steam generator 6, in the region of the first high-pressure preheater 44, in a non-illustrated manner.

A medium-pressure drum 52 is connected through a line 50 to the connecting line 46. An evaporator heating surface 56 is, in turn, connected through a recirculating pump 54 to the medium-pressure drum 52. The medium-pressure drum 52 has a steam side connected to a first reheater heating surface 57, which has an outlet side connected to a second reheater heating surface 58. The reheater heating surface 58 has an outlet side connected to an inlet of the medium-pressure part 4b of the steam turbine 4. The medium-pressure drum 52, the evaporator heating surface 56 and the two reheater heating surfaces 57 and 58, together with the medium-pressure part 4b of the steam turbine 4, form a medium-pressure stage of the water-steam circuit 8.

The second high-pressure preheater 48 has an outlet side connected through a connecting line 60 to a high-pressure drum 62. An evaporator heating surface 66 is connected through a recirculating pump 64 to the high-pressure drum 62. The high-pressure drum 62 has a steam side connected through a superheater heating surface 68 to an inlet of the high-pressure part 4a of the steam turbine 4. The high-pressure preheaters 44, 48, the high-pressure drum 62, the evaporator heating surface 66 and the superheater heating surface 68, together with the high-pressure part 4a of the steam turbine 4, form a high-pressure stage of the water-steam circuit 8.

A secondary side of a heat exchanger 70 is inserted into the transfer line 38 between the medium-pressure part 4b and the low-pressure part 4c of the steam turbine 4. An inlet of the heat exchanger 70 on the primary side is connected to an outlet 72 of the high-pressure part 4a of the steam turbine 4. A primary side outlet 74 of the heat exchanger 70 is connected through a steam line 76 to an inlet of the reheater heating surface 57 of the medium-pressure stage.

During the operation of the gas and steam turbine plant, the condensate preheater 12 is supplied by way of the pump 14 and the condensate line 10 with condensate K from the condenser 16. The condensate preheater 12 can thus be completely or partially bypassed. The condensate K is heated in the condensate preheater 12 and, for this purpose, is at least in part recirculated by way of the recirculating pump 18. The heated condensate K is passed into the feedwater container 22 through the line 20. There, the feedwater is heated through the use of extraction steam from the steam turbine 4 or from the low-pressure steam line 36, and the condensate K is expediently degasified. These operations are carried out in a non-illustrated manner. Heated feedwater S is fed, on one hand, to the low-pressure drum 28 and is fed, on the other hand, through the first high-pressure preheater 44, to the medium-pressure drum 52 and, by way of the second high-pressure preheater 48, to the high-pressure drum 62. The feedwater S that is fed to the low-pressure stage is evaporated at low pressure in the evaporator heating surface 32. Low-pressure steam ND that is separated off in the low-pressure drum 28 is fed to the superheater heating surface 34. The low-pressure steam ND which is superheated there is passed into the transfer line 38 downstream of the heat exchanger 70, i.e. on the outflow side of the secondary-side of the heat exchanger.

The feedwater S which is passed into the medium-pressure drum 52 is likewise evaporated in the evaporator heating surface 56. Steam that is separated off in the medium-pressure drum 52 and is under medium pressure is passed as medium-pressure steam MD through the reheater heating surface 57 and the reheater heating surface 58. The medium-pressure steam MD from the heat exchanger 70 is mixed in with the medium-pressure steam MD separated off in the medium-pressure drum 52, upstream of the reheater heating surface 57.

The medium-pressure steam MD, which has thus been superheated in two stages, is fed to the medium-pressure part 4b of the steam turbine 4.

Similarly, the feedwater S preheated in the second high-pressure preheater 48 is evaporated under high pressure in the evaporator heating surface 66. The high-pressure steam HD which is separated off in the high-pressure drum 64 is superheated in the superheater heating surface 68 and passed in the superheated state into the high-pressure part 4*a* of the steam turbine 4. The steam that is expanded in the high-pressure part 4*a* is passed as medium-pressure steam MD through the primary side of the heat exchanger 70 and then fed together with the medium-pressure steam MD from the medium-pressure drum 52 to the medium-pressure part 4*b* of the steam turbine 4 in the superheated state.

The low-pressure steam which is expanded in the medium-pressure part 4*b* of the steam turbine 4 is passed through the transfer line 38 as low-pressure steam ND and superheated in the heat exchanger 70 by indirect heat exchange with the medium-pressure steam MD flowing out of the high-pressure part 4*a*. Depending on the pressure and on the temperature of the live or high-pressure steam HD and depending on the expansion profile in the high-pressure part 4*a*, the medium-pressure steam MD has a temperature $T_p$ of about 350 to 400° C. The low-pressure steam ND from the medium-pressure part 4*b* leaves the steam turbine 4 at a temperature $T_s$ of about 200 to 250° C., depending on the pressure selected. Heating of the low-pressure steam ND by about 100° C. is thus achieved in the heat exchanger 70. The low-pressure steam ND that is heated up in this way, with a temperature T of about 300 to 350° C., is fed to the low-pressure part 4*c* of the steam turbine 4 together with the low-pressure steam ND flowing out of the low-pressure drum 28. The low-pressure steam ND which is expanded there is fed to the condenser 16 for condensation.

Due to the insertion of the heat exchanger 70 between the medium-pressure part 4*b* and the low-pressure part 4*c* of the steam turbine 4 for the purpose of superheating the low-pressure steam ND flowing to the low-pressure part 4*c* through the use of the medium-pressure steam MD flowing out of the high-pressure part 4*a* of the steam turbine 4, a particularly high overall efficiency of the plant is achieved. This is reflected in a high terminal output that can be taken off at a steam-turbine generator 77. The low-pressure steam ND from the low-pressure drum 28 can also be mixed in with the low-pressure steam ND from the medium-pressure part 4*b* in a non-illustrated manner ahead of the heat exchanger 70, in which case the mixture, i.e. the entire low-pressure steam ND being produced, is heated in the heat exchanger 70.

We claim:

1. A gas and steam turbine plant, comprising:
   a gas turbine having an exhaust-gas side;
   a steam turbine having a water-steam circuit, a high-pressure part, a medium-pressure part and a low-pressure part;
   a waste-heat steam generator disposed downstream of said gas turbine on said exhaust-gas side and having heating surfaces connected into said water-steam circuit of said steam turbine; and
   a heat exchanger disposed outside said waste-heat steam generator and having a primary side connected between said high-pressure part and said medium-pressure part of said steam turbine and a secondary side connected between said medium-pressure part and said low-pressure part of said steam turbine.

2. The plant according to claim 1, wherein said medium-pressure part has an inlet, and at least one reheater heating surface is connected downstream of said high-pressure part between said primary side of said heat exchanger and said inlet of said medium-pressure part.

3. The plant according to claim 1, including an evaporator heating surface disposed in said waste-heat steam generator and having an outlet side connected to said primary-side outlet of said heat exchanger.

4. The plant according to claim 1, wherein said water-steam circuit has three pressure stages, each of said pressure stages has an evaporator ;eating surface and at least one superheater heating surface, and at least one reheater heating surface is connected between said high-pressure part and said medium-pressure part of said steam turbine.

5. A method for operating the gas and steam turbine plant according to claim 1, which comprises:
   providing said water-steam circuit with three pressure stages;
   using heat contained in an expanded operating medium from said gas turbine to produce steam for said steam turbine;
   conducting feedwater in said water-steam circuit, and evaporating and superheating the feedwater in said heating surfaces of said waste-heat steam generator; and
   heating low-pressure steam flowing to said low-pressure part of said steam turbine by indirect heat exchange with medium-pressure steam flowing out of said high-pressure part of said steam turbine.

6. The method according to claim 5, which comprises cooling the medium-pressure steam during the indirect heat exchange, superheating the cooled medium-pressure steam in said waste-heat steam generator, and then feeding the superheated steam to said steam turbine.

7. The method according to claim 6, which comprises producing medium-pressure steam in the waste-heat steam generator, and superheating the medium-pressure steam in the waste-heat steam generator together with the cooled medium-pressure steam.

8. The method according to claim 5, which comprises mixing low-pressure steam produced in the waste-heat steam generator with the low-pressure steam heated by indirect heat exchange.

9. The method according to claim 6, which comprises mixing low-pressure steam produced in the waste-heat steam generator with the low-pressure steam heated by indirect heat exchange.

10. The method according to claim 7, which comprises mixing low-pressure steam produced in the waste-heat steam generator with the low-pressure steam heated by indirect heat exchange.

* * * * *